US012723395B1

(12) United States Patent
Blakely et al.

(10) Patent No.: US 12,723,395 B1
(45) Date of Patent: Sep. 1, 2026

(54) SEWER EXPANSION PLUG

(71) Applicant: CAMCO MANUFACTURING, LLC, Greensboro, NC (US)

(72) Inventors: Brandon Blakely, Burlington, NC (US); Gregory Walton, Kernersville, NC (US); Niko Jovicevic, Statesville, NC (US); Bruce Andrew Angel, Stokesdale, NC (US); Blake Lamb, Greensboro, NC (US); Steven L. Spencer, Lawsonville, NC (US)

(73) Assignee: Camco Manufacturing, LLC, Greensboro, NC (US)

( * ) Notice: Subject to any disclaimer, the term of this patent is extended or adjusted under 35 U.S.C. 154(b) by 0 days.

(21) Appl. No.: 19/185,047

(22) Filed: Apr. 21, 2025

(51) Int. Cl.
*E03F 7/08* (2006.01)
*F16L 37/248* (2006.01)
*F16L 55/132* (2006.01)

(52) U.S. Cl.
CPC .............. *E03F 7/08* (2013.01); *F16L 37/248* (2013.01); *F16L 55/132* (2013.01)

(58) Field of Classification Search
CPC ......... E03F 7/08; F16L 13/147; F16L 13/166; F16L 21/007; F16L 21/04; F16L 33/213; F16L 37/107; F16L 37/248; F16L 37/05; F16L 55/136; F16L 55/132
See application file for complete search history.

(56) References Cited

U.S. PATENT DOCUMENTS 2,607,370 A * 8/1952 Anderson ............. F16L 55/136 138/90
4,328,837 A * 5/1982 Dagn ..................... B65D 39/12 138/90
4,467,636 A * 8/1984 Dagn ...................... G01M 3/26 73/49.8
4,758,027 A * 7/1988 Todd ....................... E03F 1/008 285/179
6,135,140 A * 10/2000 Grandinetti ............... E03F 1/00 251/150

(Continued)

FOREIGN PATENT DOCUMENTS

DE 19842743 A1 * 3/2000 ............ F16L 55/132
GB 1327913 A * 8/1973 .............. F16L 21/04
WO WO-2007062709 A1 * 6/2007 ............ F16L 37/248

OTHER PUBLICATIONS

Machine English translation of DE-19842743-A1 (Year: 2026).*
Machine English translation of WO-2007062709-A1 (Year: 2026).*

*Primary Examiner* — Hailey K. Do
(74) *Attorney, Agent, or Firm* — Tuggle Duggins PA; Blake P. Hurt

(57) ABSTRACT

A sewer expansion plug for connecting a sewer house to a cleanout pipe that expands a grip ring by rotating a handle. The grip ring includes multiple diameters to accommodate various size blackwater cleanout pipes. The handle connects to a wedge plate, which converts rotational force from the handle into linear movement that expands the grip ring by lowering the wedge plate and pressing slides outward. As the wedge plate moves, it expands a grip ring around the pipe to interface with an interior circumference of the blackwater cleanout pipe. The wedge plate is connected to a base attached to the grip ring to secure the grip ring in place, allowing the pipe to be inserted into the blackwater disposal system.

20 Claims, 16 Drawing Sheets

(56) References Cited

U.S. PATENT DOCUMENTS

| | | | | |
|---|---|---|---|---|
| 6,170,882 | B1 * | 1/2001 | Prest | E03F 1/008<br>285/376 |
| 7,156,574 | B1 * | 1/2007 | Garst | B60R 15/00<br>137/181 |
| D564,637 | S * | 3/2008 | Brockington | D23/263 |
| 7,722,091 | B1 | 5/2010 | Brockington et al. | |
| 8,465,059 | B1 * | 6/2013 | Price | F16L 27/08<br>285/278 |
| D855,781 | S | 8/2019 | Delancey et al. | |
| 10,865,556 | B2 * | 12/2020 | Wright | E03F 1/008 |

* cited by examiner

SEWER EXPANSION PLUG

TECHNICAL FIELD

The present disclosure relates generally to recreational vehicle (RV) blackwater disposal. In particular, some aspects of the disclosure may relate to systems and methods for disposing of blackwater using a sewer expansion plug.

DESCRIPTION OF RELATED ART

Recreational vehicles (RVs) are often equipped with blackwater systems designed to manage and dispose of sewage. These systems typically involve a series of pipes and connectors that facilitate the safe and sanitary disposal of waste. Common methods for disposing of blackwater often involve connecting a sewer hose from the RV directly to a designated cleanout pipe at a dump station or other disposal site.

Traditionally, the connection between the RV's sewer hose and the cleanout pipe is made using a threaded connection. In such setups, the sewer hose may be equipped with a connector that screws directly into the cleanout pipe. While this method may be straightforward, it can present challenges. For example, achieving a tight seal can be difficult if threads on either the hose or the cleanout pipe are worn or damaged, a common issue found at many dump stations. Additionally, the process of screwing and unscrewing the hose can be cumbersome and time-consuming, especially if the user lacks the physical strength, dexterity, or lighting required.

To address some of these challenges, various connector designs have been developed. One common solution is the use of bayonet-style connectors. These connectors feature tabs that align with slots on the cleanout pipe, allowing the user to twist and lock the connection in place without needing to thread a pipe. While this design simplifies the connection process and reduces the risk of cross-threading, it still requires the cleanout pipe to have a complementary bayonet-style connector, which may not be present at all dump stations.

In addition to bayonet-style connectors, some systems use connector pipes that either screw into the cleanout pipe or employ plugs that can be pressed into place. Connector pipes that screw into the cleanout pipe can present similar challenges to direct threading, including potential issues with worn threads and achieving a tight seal. Alternatively, plug-style connectors are designed to be pressed into the cleanout pipe, offering a potentially quicker setup. However, these plugs often require considerable strength to pull out, which can be difficult for some users. Furthermore, the process of removing a plug can be messy, increasing the risk of exposure to sewage during disconnection.

Despite these improvements, existing systems continue to face various issues. One significant problem is the potential for leakage at the connection point. This can occur due to an inadequate seal or misalignment during connection. Leakage not only creates a sanitation hazard but also raises environmental concerns, as untreated sewage can contaminate surrounding areas.

Another issue with current systems is the difficulty in monitoring the flow of sewage through the hose. Without a clear view of the waste as it passes through the system, users may inadvertently cause blockages, overflows, and/or premature disconnections, leading to unpleasant and potentially hazardous situations. This lack of visibility can also make it challenging to determine when the disposal process is complete.

While traditional and improved connection methods exist for RV blackwater disposal systems, they still encounter various drawbacks, including potential leaks, the complexity of connections, and a lack of visibility during disposal.

BRIEF SUMMARY OF THE DISCLOSURE

Embodiments of the present disclosure may include a sewer expansion plug with a handle, a pipe attachable to a sewer hose, a wedge plate mechanically connected to the handle, wherein the wedge plate translates a rotational force generated by rotation of the handle into linear movement, slides coupled to the wedge plate, wherein the slides guide the wedge plate upon actuation of the handle, a grip ring surrounding the pipe, wedge plate, and slides, wherein the grip ring expands outward when moved by the wedge plate, and a base attached to the grip ring and the pipe, wherein the base guides the slides into a locked position.

Further embodiments may include the handle being secured in the locked position by a cam lock, the grip ring being constructed from a molded elastomeric component with stepped increments and a textured surface, the pipe being a transparent elbow pipe including a male or female bayonet attachment, the transparent elbow pipe further including guide rails, and wherein the wedge plate is attached to the guide rails.

Embodiments of the present disclosure may further include a sewer expansion plug for connecting a sewer hose to a blackwater disposal system. In such embodiments, the sewer expansion plug may include a molded plastic handle comprising a cam-shaped shoulder, a transparent elbow pipe attachable to a blackwater disposal hose, a wedge plate mechanically connected to the handle and slides, wherein the wedge plate translates a rotational force generated by rotation of the molded plastic handle into linear movement of the wedge plate along the slides, an elastomeric grip ring including variable diameters and surrounding the pipe, wedge plate, and slides, wherein the diameter of the elastomeric grip ring is varied by actuation of the handle mechanically connected to the wedge plate interfacing with the grip ring, and a molded plastic base attached to the grip ring, slides, and transparent elbow pipe, wherein the molded plastic base aligns the wedge plate, slides, and grip ring.

Further embodiments may include the molded plastic handle being secured in a locked position by the cam-shaped shoulder engaging a cam lock, the elastomeric grip ring including a textured surface and/or stepped increments, the transparent elbow pipe including a male or female bayonet attachment, the slides including integrated stops, and the elastomeric grip ring's variable diameters corresponding to cleanout pipe diameters.

Embodiments of the present disclosure may further include a method of connecting a sewer expansion plug to a cleanout pipe. The method including inserting a base of the sewer expansion plug into the cleanout pipe, expanding a grip ring attached to the base by rotating a handle downward, locking the handle in place via a cam lock, channeling waste through a connected sewer hose, releasing the handle upward to release the cam lock and retract the grip ring, and removing the expansion plug from the cleanout pipe.

Further embodiments of the method may include sliding the wedge plate to expand the grip ring by rotating the handle downward, inserting the base a predetermined amount corresponding to the diameter of the cleanout pipe, attaching the sewer hose before inserting the sewer expansion plug into the cleanout pipe, attaching the sewer hose after inserting the sewer expansion plug into the cleanout pipe, and inspecting a transparent elbow pipe to ensure completion of waste discharge.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto and their equivalents thereof.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
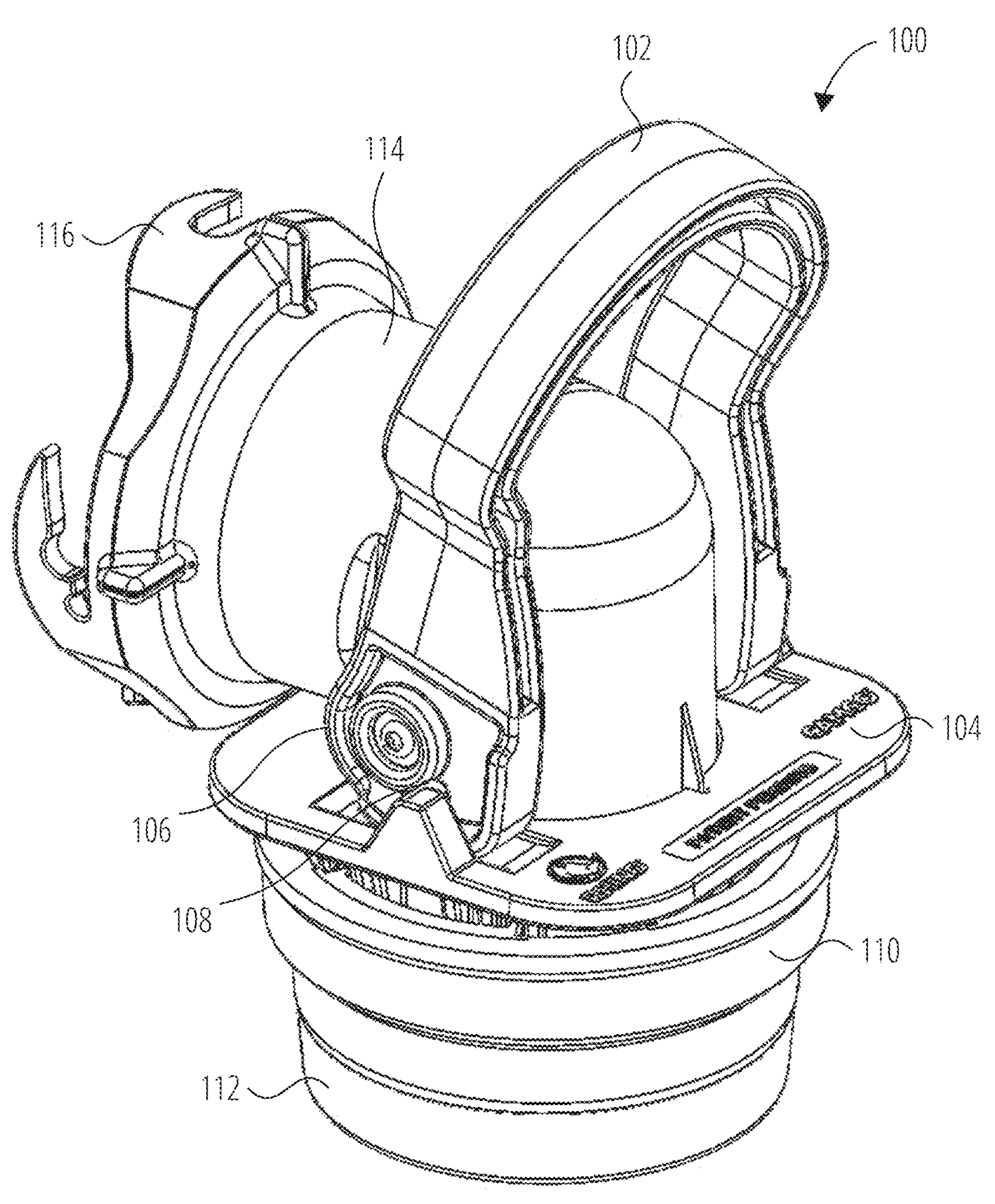
FIG. 1 is a diagram showing a rear perspective view of an example sewer expansion plug, in accordance with various embodiments of the disclosed technology.

The figures are not exhaustive and do not limit the present disclosure to the precise form disclosed.

DETAILED DESCRIPTION

The present disclosure discusses a sewer expansion plug for use in combination with RV blackwater disposal systems and RV dump sites/cleanout pipes. Traditional methods of connecting sewer hoses to cleanout pipes have often relied on threaded connections, which may be prone to leaks and be cumbersome to operate, especially when threads are worn or damaged. The presently disclosed sewer expansion plug improves upon these issues by introducing a design that enhances sealing, ease of use, and visibility, thereby improving the disposal experience for RV users.

The sewer expansion plug may include a wedge plate, which may convert rotational force applied by a user to a handle, into linear movement of the wedge plate to expand the grip ring to seal to the inside circumference of a cleanout pipe. The wedge plate may be connected to the handle, allowing users to expand the grip ring surrounding the connection components without physically touching a part of the cleanout pipe with a user's hand. The grip ring may be constructed from a flexible elastomeric material with stepped increments. The flexible elastomeric material may include, for example, molded rubber, thermoplastics (TPE, TPU, PVC), silicone (LSR or RTV), polyurethane, foam materials (EVA, PE, PU), fabric-reinforced materials, and 3D-printed elastomers. The stepped increments may be different diameters (decreasing in size from nearest to the handle to the base) allowing for the sewer expansion plug to fit and seal within various diameter cleanout pipes. The various diameters of the grip ring's stepped increments may correspond to conventional cleanout pipe diameters minus a discrete amount to accommodate insertion and removal of the sewer expansion plug. This expansion design may mitigate the common problem of thread wear and/or misalignment by no longer requiring users to thread or plug-by-force a plug into the cleanout pipe, reducing the risk of leaks and preventing environmental mishaps.

Present embodiments of the sewer expansion plug may incorporate an ergonomic handle secured by a cam lock, which may improve retention of the grip ring upon expansion. In other words, the cam lock may secure the handle in a locked position to maintain the sewer expansion plug in the cleanout pipe. This structure may simplify the process of connecting and disconnecting the sewer expansion plug, making it accessible to users with varying levels of physical strength and dexterity. Additionally, slides may be coupled to the wedge plate to more uniformly distribute its movement along the inside of the grip ring. The cam lock may further improve usability by providing a quick and reliable method to secure the handle in the locked position and release the handle into the unlocked position.

The sewer expansion plug may be constructed from various materials to suit different preferences, requirements, and operating conditions. For example, the handle, the wedge plate, the slides, and the base may be made from molded plastic, providing durability and resistance to environmental factors. A transparent elbow pipe, which can feature either a male or female bayonet attachment (or, alternatively, a different attachment feature altogether), may be made from a transparent plastic or polymer, offering visibility into the flow of sewage, which can address the lack of transparency associated with traditional systems. This transparency may allow users to monitor the disposal process, helping prevent blockages and ensuring the complete discharge of waste prior to disconnection. The grip ring may be constructed from a molded flexible elastomeric material.

In addition to its sealing capabilities, the grip ring may include a textured surface, for example, bumps, protrusions, ridges, or depressions, which may improve sealing between the grip ring and the cleanout pipe, and further improve accommodation of varying pipe diameters. The sewer expansion plug may be compatible with a wide range of cleanout pipes found at RV dump sites, overcoming the limitations of systems reliant on specific connector types and plugs that may be an inappropriate diameter for requisite cleanout pipes. Furthermore, the wedge plate may include slide to more uniformly distribute pressure onto the grip ring and, further, may operate along guide rails to provide stability during operation, improving the reliability of the connection.

A method of connecting the sewer expansion plug to a cleanout pipe may include a user inserting the base and grip ring into the cleanout pipe, rotating the handle downward to expand the grip ring, and locking the handle into a locked position using the cam lock. Waste may then be channeled through a connected sewer hose, with the transparent elbow pipe allowing for real-time monitoring. Upon disposal completion, a user may release the handle upward into an unlocked position to retract the grip ring, enabling easier removal of the plug without the force associated with traditional plug-style connectors.

Figure 2:
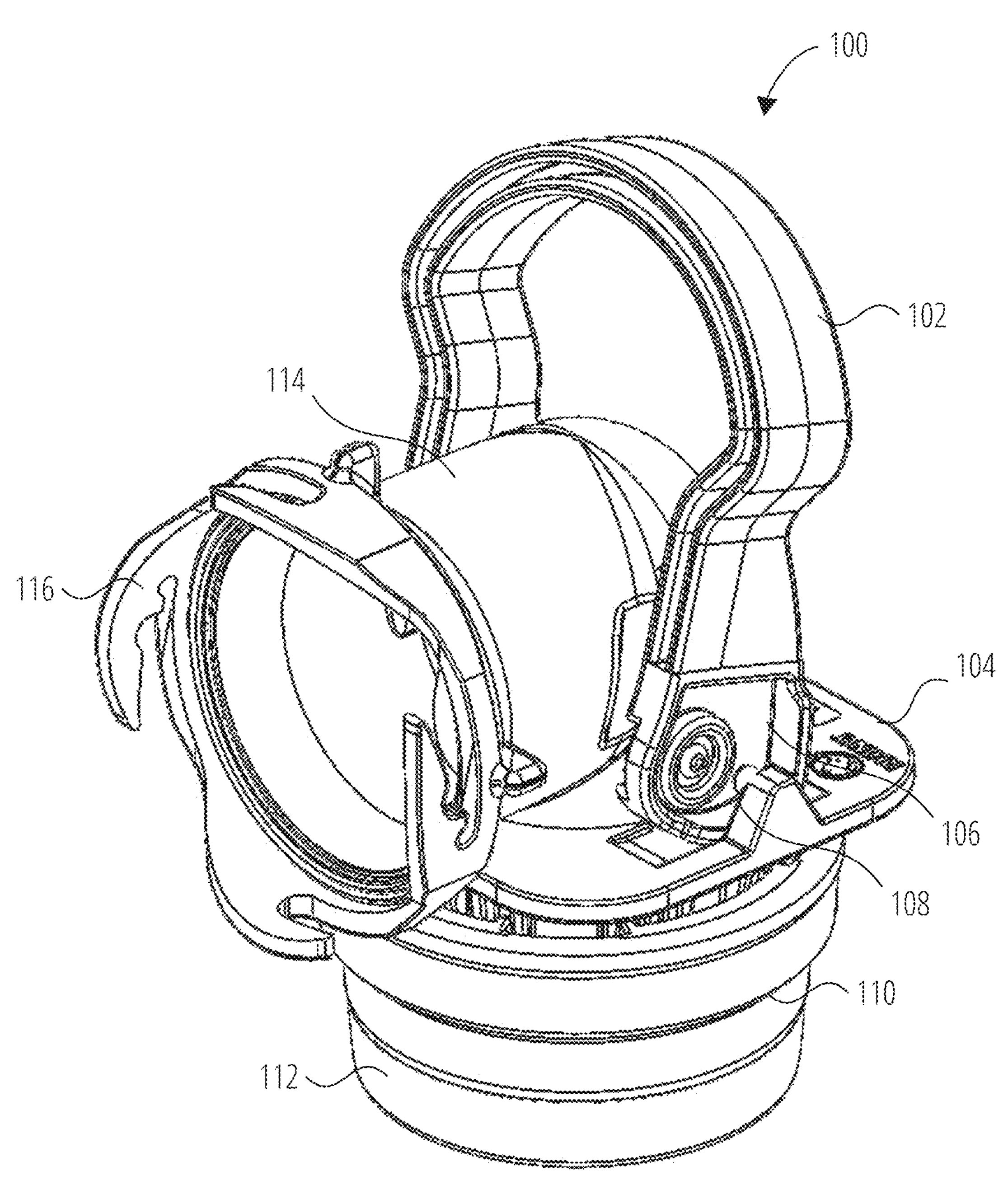
FIG. 2 is a diagram showing a front perspective view of an example sewer expansion plug, in accordance with various embodiments of the disclosed technology.

With respect to the figures, FIGS. 1 and 2 depict a rear perspective view and a front perspective view, respectively, of an example sewer expansion plug 100, in accordance with various embodiments of the disclosed technology. The sewer expansion plug 100 may include a handle 102 with a cam-shaped shoulder 106 interfaced with a cam lock 108. Some embodiments may include cam-shaped shoulders 106 on either end of the handle 102, while other embodiments may only include one cam-shaped shoulder 106 on a first end of the handle 102. The handle 102 may be connected to a wedge plate 104 via the cam-shaped shoulders 106, where a cam of the cam-shaped shoulder 106 may depress the wedge plate 104 when the handle 102 is rotated. The wedge plate 104 may be surrounded by a grip ring 110, which may be vertically secured by a base 112. Through the approximate center of the wedge plate 104, surrounded by the grip ring 110, may be a transparent elbow pipe 114. The transparent elbow pipe 114 may be connectable to a sewer hose via a bayonet attachment 116. The transparent elbow pipe 114 may further be connected to the wedge plate 104 or base 112 by screws, bolts, rivets, and/or by other attachment mechanisms (as discussed in relation to FIG. 6).

The handle 102 may include a first end and a second end. Either or both ends may include a cam-shaped shoulder 106, which may facilitate locking with the cam lock 108. The handle 102 may be of a geometry to ergonomically fit a user's hand, such that the area of the handle 102 furthest from the first and second end may extend laterally outward beyond the cam-shaped shoulders 106, creating a contoured area to comfortably accommodate a user's palm. The handle 102 may serve as an alternative place to grip and maneuver the sewer hose, which may keep the user's hands from physically touching an unwieldy flexible sewer hose. Alternative handle embodiments may exist, for example, the handle may be square and not feature an ergonomic grip.

The cam-shaped shoulder 106 may be rounded to allow for rotation of the handle 102 upon operation by a user. The cam-shaped shoulder 106 may include a circular protrusion about which the wedge plate 104 can rotate when the handle 102 is operated upon. The cam-shaped shoulder 106 may include a cam or extended portion of the cam-shaped shoulder 106 that, when rotated, may press against the wedge plate 104 to facilitate vertical movement of the wedge plate 104. The cam-shaped shoulder 106 may further include a hole, through which the transparent elbow pipe 114 may be secured.

The cam lock 108 may include a rotating part with a curved surface (e.g., the circular protrusion of the cam-shaped shoulders 106) that, when rotated by the handle 102, engages or disengages a locking mechanism. As the handle 102 rotates down, a cam pushes the wedge plate 104 down, while simultaneously pressing the grip ring to a maximum expansion, and then releasing a small amount of pressure, which holds the handle 102 in the locked position. This cam lock 108 may keep the sewer expansion plug 100 more firmly in place until the user pulls the handle 102 up into the unlocked position. Locking the handle 102 can also be accomplished with a switch, lever, latch, electronic control unit, and/or similar.

The wedge plate 104 may be substantially square upon a top surface and include a circular or contoured hole through the center, through which, the transparent elbow pipe 114 may pass through. The lower portion of the wedge plate 104 may include a circular frame. The circular frame's circumference may decrease as it extends away from the wedge plate's 104 top surface. Further discussion of the wedge plate 104 can be found with relation to FIGS. 8-9.

The wedge plate 104 may be encircled by a grip ring 110. The grip ring 110 may be annular. The grip ring 110 may be a molded flexible elastomeric structure with stepped increments. The stepped increments may have different circumferences on each step. For example, a grip ring 110, as depicted in FIG. 1, may include two incremental steps. The first or upper, closer to the top surface of the wedge plate 104, stepped increment may be of a greater circumference or diameter than the lower stepped increment, which may be closer to the base 112. The stepped increments may allow for a user to secure the sewer expansion plug 100 in various diameter cleanout pipes without changing the grip ring 110.

For example, for a narrower cleanout pipe, a user may partially insert the grip ring 110 such that the lower step interfaces with the inside of the cleanout pipe, and then rotate the handle 102 to the locked position expanding the lower stepped increment to secure the grip ring 110 to the cleanout pipe. This may be advantageous in such a scenario as the upper stepped increment may be too wide to fit into a narrower cleanout pipe without exerting significant force. As such, without the multiple stepped increments, a user may be unable to press the sewer expansion plug 100 into narrower cleanout pipes. Alternatively, in scenarios with larger diameter cleanout pipes, the lower step may not create a sufficient seal to prevent leakage or odor from escaping. In such scenarios, the upper step may be inserted (past the lower step) to create a more secure seal.

Figure 10:
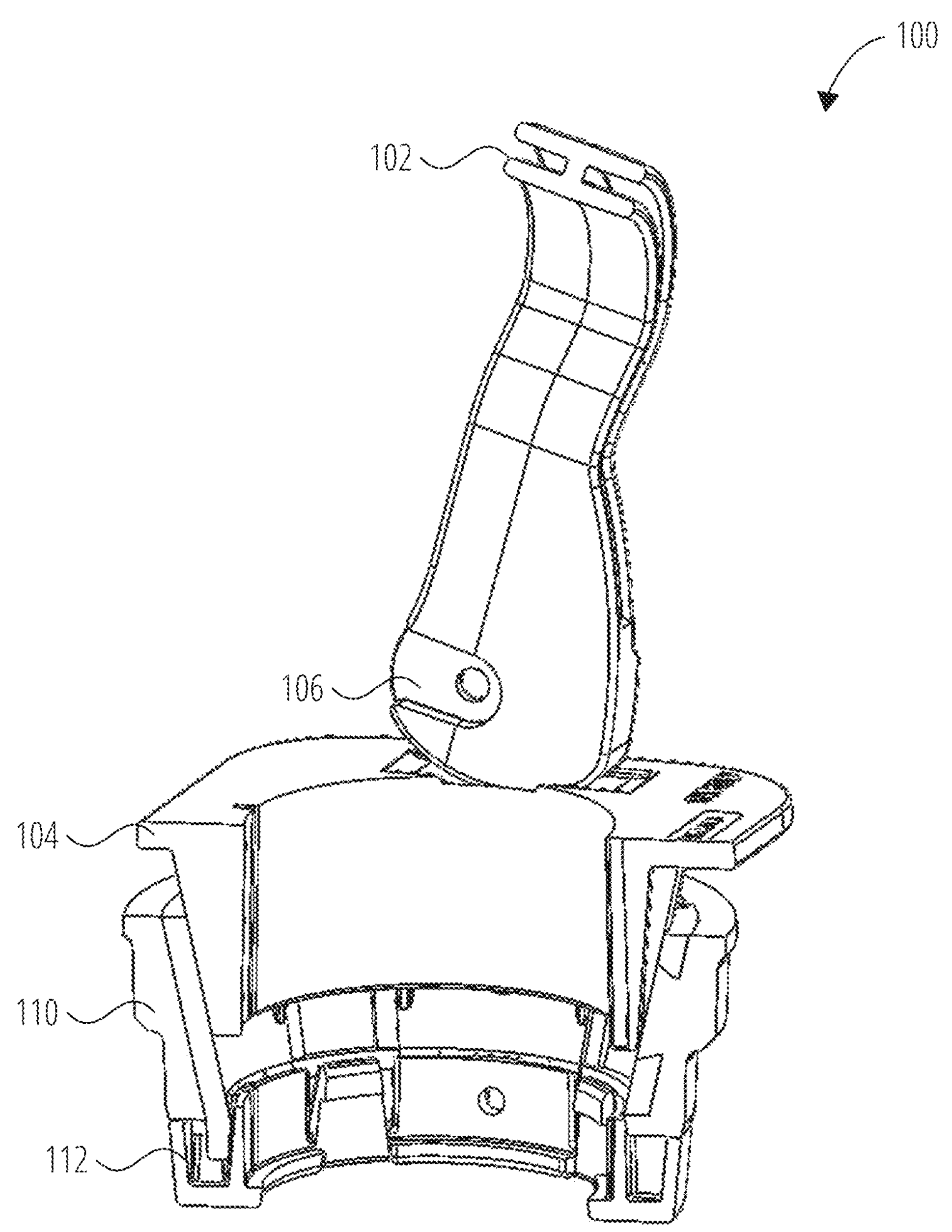
FIG. 10 is a diagram showing a skeleton side perspective view of an example wedge plate surrounded by a grip ring attached to a base, where the wedge plate is further connected to a handle, in accordance with various embodiments of the disclosed technology.
Figure 11:
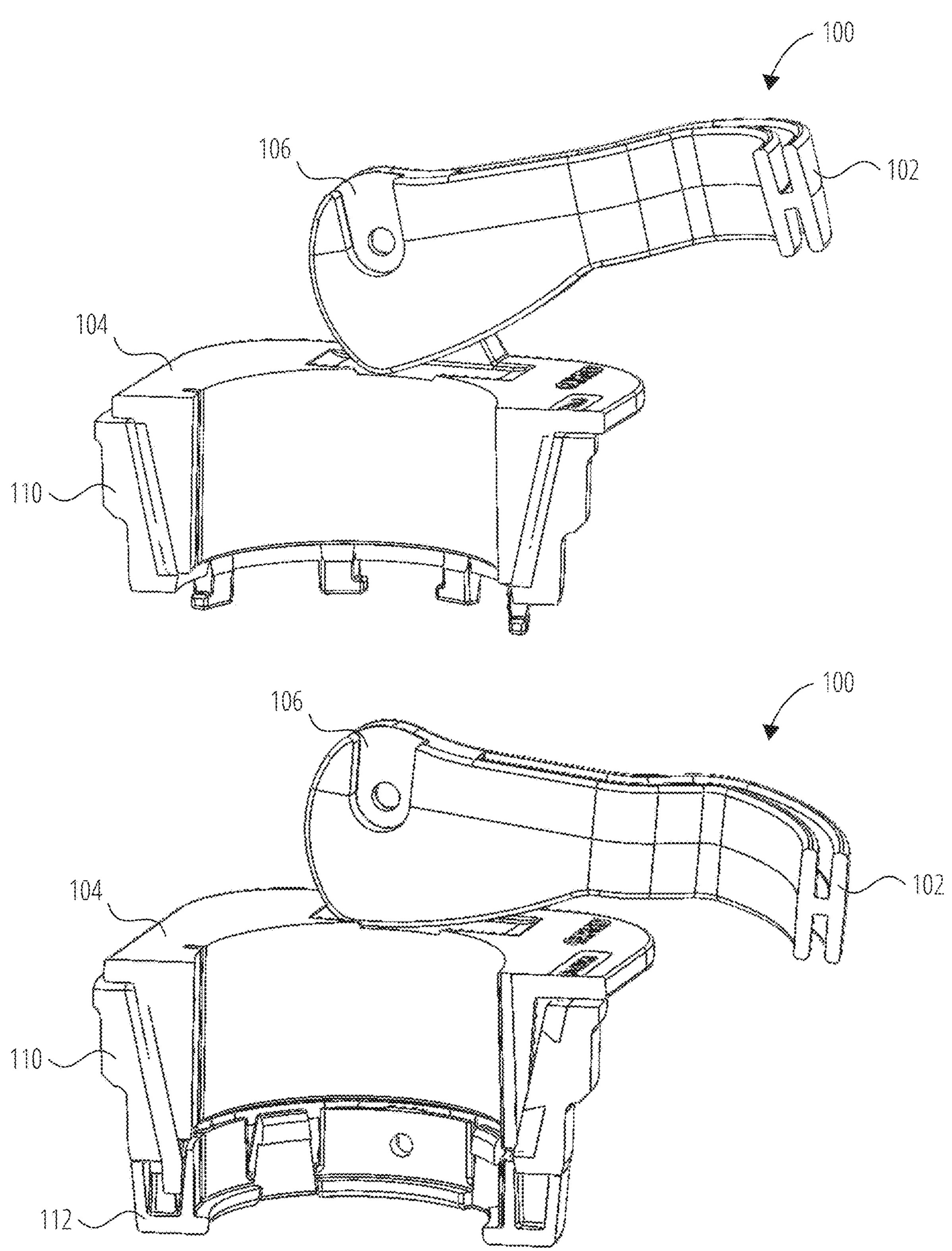
FIG. 11 is a diagram showing two skeleton side perspective views of an example wedge plate connected to a handle where the handle is actuated and in a locked position, respectively, in accordance with various embodiments of the disclosed technology.

The base 112 may be internally connected to the circular frame of the wedge plate 104 (as depicted in FIGS. 10-11). The base 112 may be a circular plastic structure with a vertical height and lateral width. The base 112 may secure the grip ring 110 within the sewer expansion plug 100 by securing a bottom area of the grip ring 110 such that the grip ring 110 cannot slide off the circular frame of the wedge plate 104. The base 112 may also serve as a structure to stand the sewer expansion plug 100 on when placed on a flat or partially flat surface. For example, a user may need to uncap a cleanout pipe, during which the user may place the sewer expansion plug 100 on its base on the ground near the cleanout pipe. In such examples, the base 112 may improve the sewer expansion plug's 100 vertical storage capability, e.g., the sewer expansion plug 100 may remain upright when placed on a substantially flat surface.

The transparent elbow pipe 114 may pass through the wedge plate 104, grip ring 110, and base 112. The transparent elbow pipe 114 may curve or angle above the wedge plate's 104 top surface and extend out beyond an edge of the wedge plate 104 to allow for a sewer hose to connect thereto. The transparent elbow pipe 114 may curve or angle at a degree such that the curved portion of the pipe, which extends beyond the edge of the top surface of the wedge plate 104, may be beneath the handle 102 when the handle is in the unlocked position. The transparent elbow pipe 114 may also be disconnectable from the sewer expansion plug 100 allowing for other types of pipes to be inserted in its place. For example, a straight pipe may be placed through the sewer expansion plug 100, a non-transparent elbow pipe may be placed through the sewer expansion plug 100, or an illuminated elbow pipe, including integrated light sources, may be placed through the sewer expansion plug 100 to assist with reduced lighting scenarios. The transparent elbow pipe 114 may include a bayonet attachment 116 on a connection end. The bayonet attachment 116 may be male or female (e.g., bayonet attachment 116 as depicted in FIG. 1 is a male bayonet attachment). The bayonet attachment 116 may include teeth that extend beyond the connection end of the transparent elbow pipe 114 that engage and secure with complementary protrusions on a female bayonet attachment. For example, a sewer hose may include a female bayonet attachment on an end, which may be secured to the male bayonet attachment of the transparent elbow pipe 114. Other attachment mechanisms may be used in combination with the transparent elbow pipe 114 to attach the transparent elbow pipe 114 to a sewer hose. Alternatively, a sewer hose of an appropriate diameter may extend through the wedge plate and be used for disposal in place of the transparent elbow pipe 114.

Figure 3:
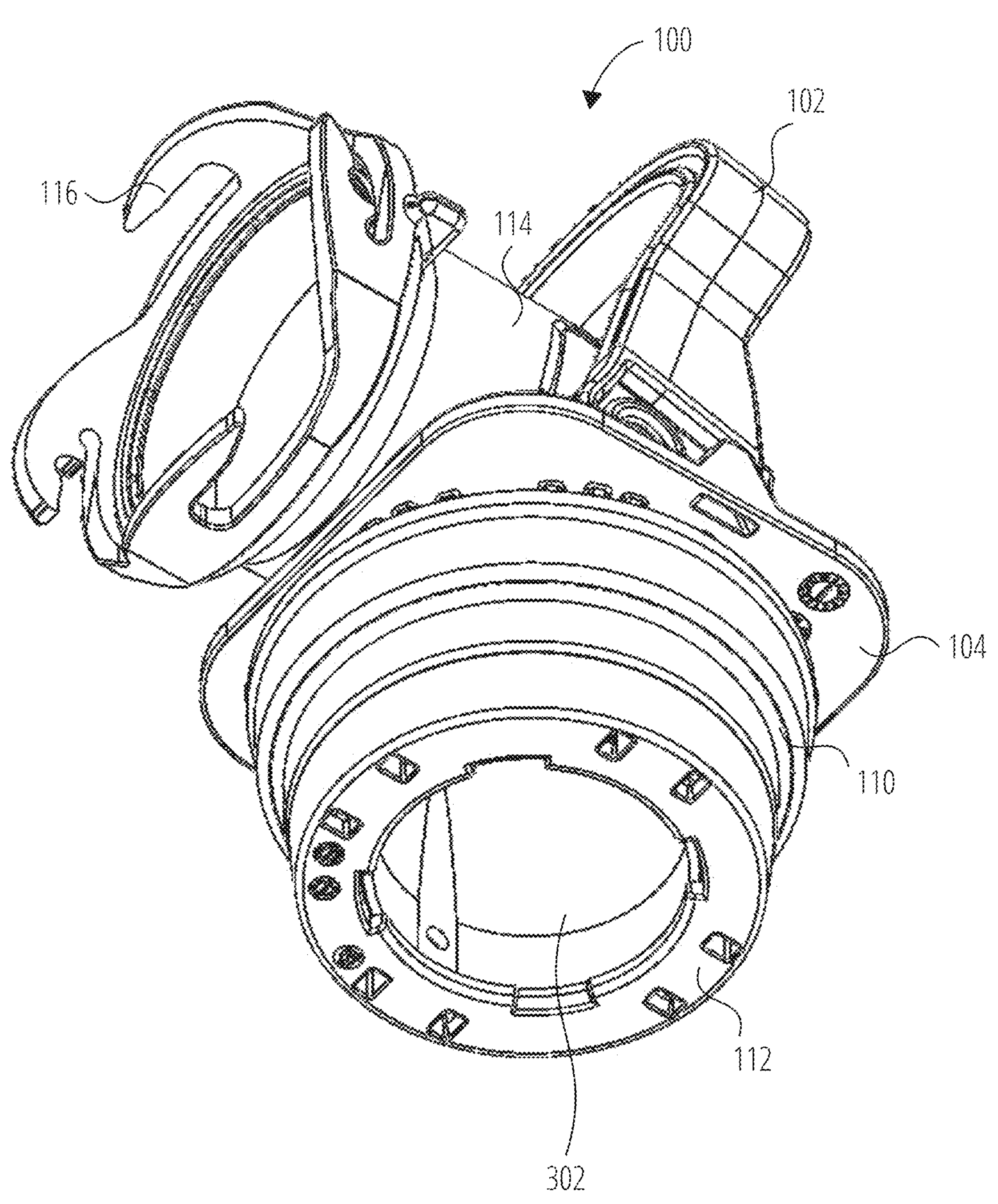
FIG. 3 is a diagram showing a lowered perspective view of an example sewer expansion plug, in accordance with various embodiments of the disclosed technology.

FIG. 3 is a diagram showing a lowered perspective view of an example sewer expansion plug 100, in accordance with various embodiments of the disclosed technology. Similarly to FIGS. 1 and 2, the sewer expansion plug 100 may include a handle 102, a wedge plate 104, a grip ring 110, a base 112, a transparent elbow pipe 114, and a bayonet attachment 116. However, notably, FIG. 3 further includes a bottom portion of the transparent elbow pipe 302. The bottom portion of the transparent elbow pipe 302 may be disposed through the center area of the wedge plate 104 and connect to the base 112. The bottom portion of the transparent elbow pipe 302 may be where the sewage is discharged from, such that sewage may pass through the sewer hose, through the transparent elbow pipe 114, and exit the sewer expansion plug 100 at the bottom portion of the transparent elbow pipe 302. The bottom portion of the transparent elbow pipe 302 may be a portion of the transparent elbow pipe 114 that passes through the wedge plate 104 and extends to the point where the base 112 connects to the wedge plate 104. The bottom portion of the transparent elbow pipe 302 may alternatively be a distinct portion of pipe, which may or may not be transparent and may or may not be integrated into the wedge plate 104, that connects to the transparent elbow pipe 114 internally of the sewer expansion plug 100.

Figure 4:
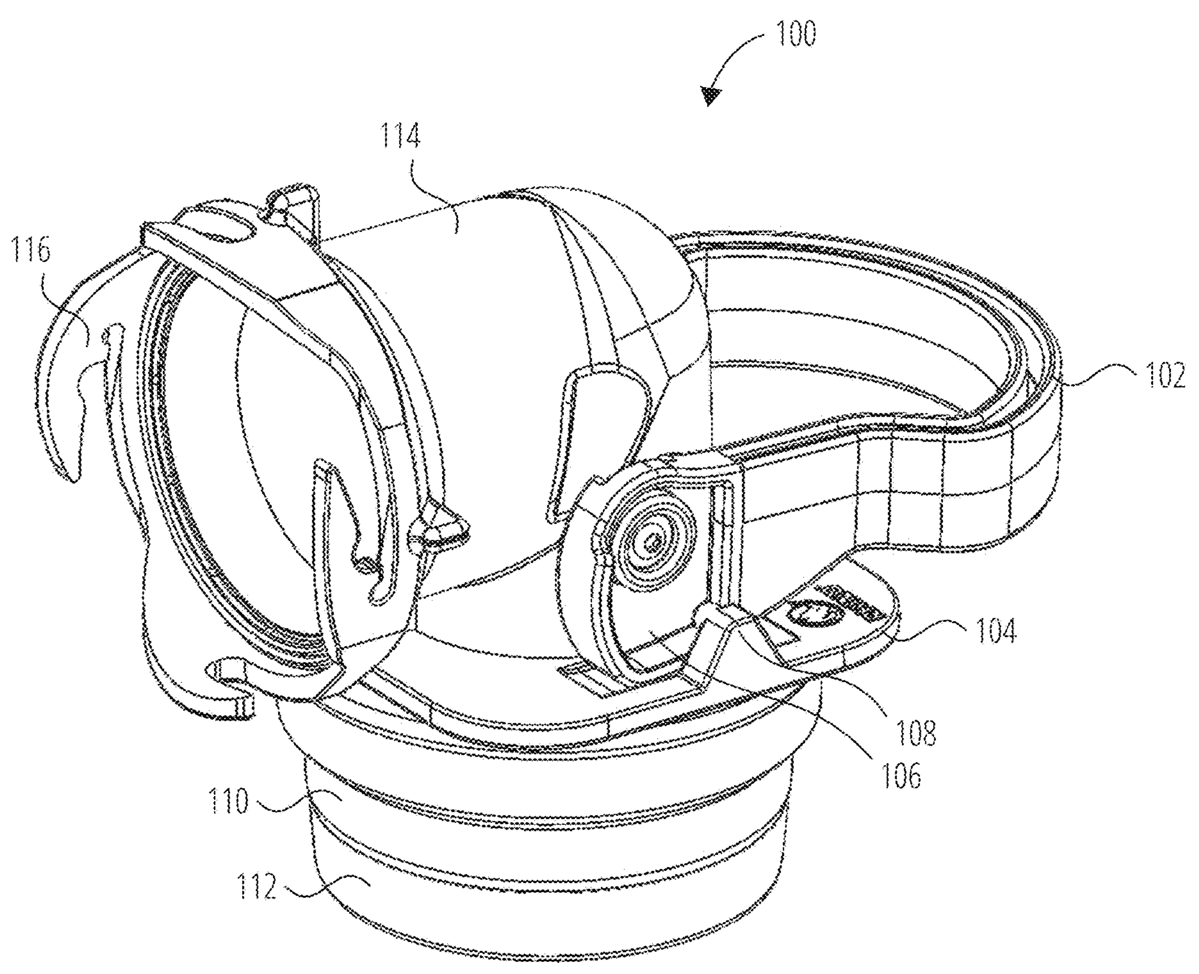
FIG. 4 is a diagram showing a second front perspective view of an example sewer expansion plug with a handle rotated and in a locked position, in accordance with various embodiments of the disclosed technology.

FIG. 4 is a diagram showing a second front perspective view of an example sewer expansion plug 100 with a handle 102 rotated and in a locked position, in accordance with various embodiments of the disclosed technology. Similarly to FIGS. 1-3, the sewer expansion plug 100 may include a handle 102, a wedge plate 104, a cam-shaped shoulder 106, a cam lock 108, a grip ring 110, a base 112, a transparent elbow pipe 114, and a bayonet attachment 116. However, notably, the handle 102 in FIG. 4 is secured in a locked position. To reach the locked position, a user may rotate the handle 102 from an unlocked position, as depicted in FIGS. 1-3, about the cam-shaped shoulders 106 to secure the handle 102 in a locked position via the cam lock 108. Of note, when the handle 102 is rotated about the cam-shaped shoulder 106, a cam may press the wedge plate 104 downward to expand the grip ring 110.

Figure 5:
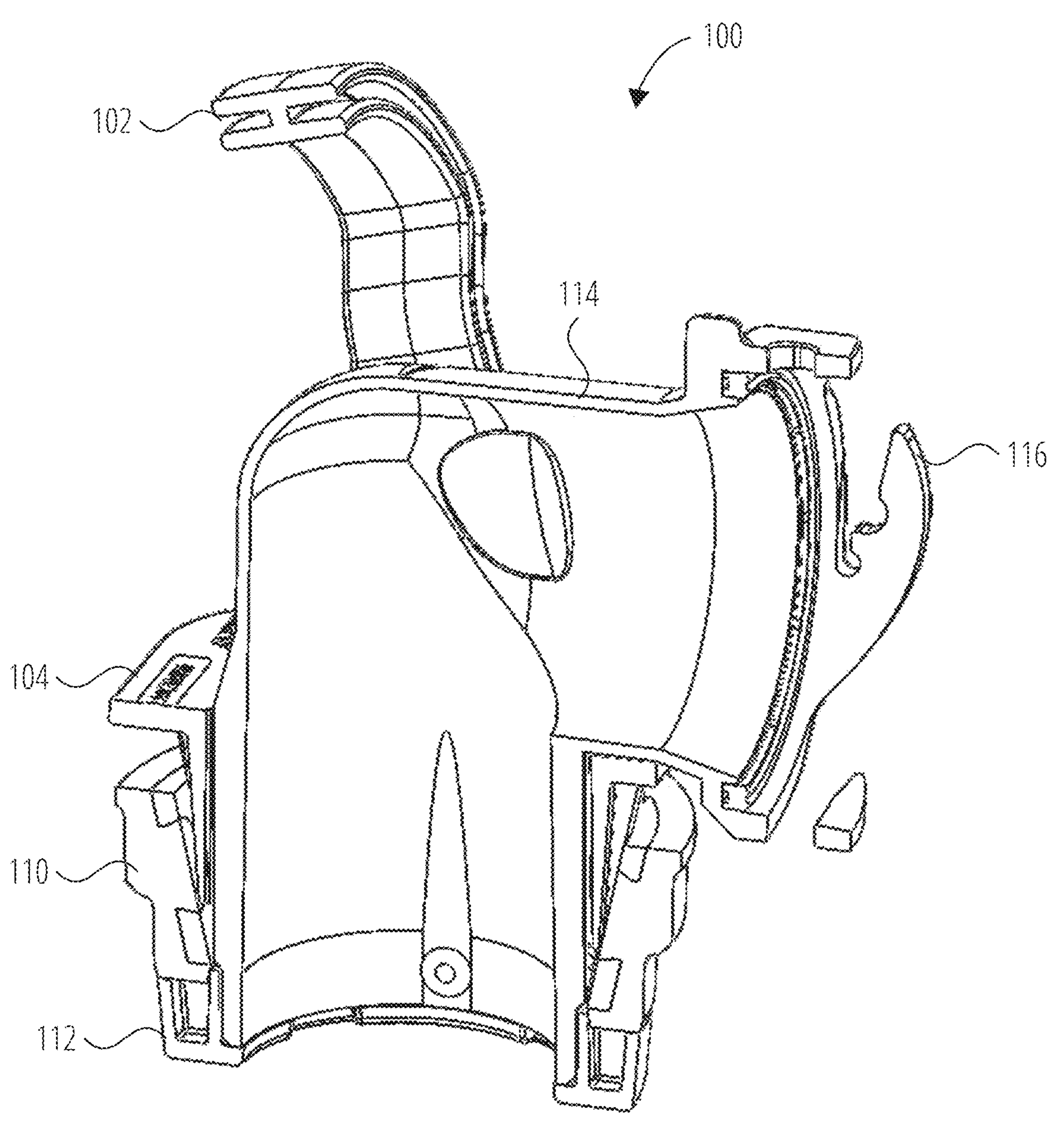
FIG. 5 is a diagram showing a skeleton front perspective view of an example sewer expansion plug, in accordance with various embodiments of the disclosed technology.

FIG. 5 is a diagram showing a skeleton front perspective view of an example sewer expansion plug 100, in accordance with various embodiments of the disclosed technology. Similarly to FIGS. 1-4, the sewer expansion plug 100 may include a handle 102, a wedge plate 104, a grip ring 110, a base 112, a transparent elbow pipe 114, and a bayonet attachment 116. However, notably, the skeleton perspective may illustrate the structure of the wedge plate 104 in relation to the grip ring 110 and base 112. In particular, the wedge plate 104, as its depressed downward via linear movement by the rotation of the handle 102, may press upon a back side of the grip ring 110 to expand the grip ring 110 outward. The circular frame of the wedge plate 104 may allow for expansion of the grip ring 110 due to its varying circumference. In other words, since the grip ring 110 is wider close to the top surface of the wedge plate 104, as the wedge plate 104 is pressed down by the handle 102 the wider portion of the circular frame may press laterally outward or expand the grip ring 110 to expand to an interior wall of the cleanout pipe.

Furthermore, FIG. 5 illustrates the structure of the base 112 in relation to the bottom portion of transparent elbow pipe and grip ring 110. For example, the base may laterally extend inward to support the bottom portion of transparent elbow pipe, while the area between an exterior surface of the base 112 and the area supporting the bottom portion of transparent elbow pipe may support the grip ring 110, and prevent the grip ring 110 from falling off the bottom of the sewer expansion plug 100 when not in place.

Figure 6:
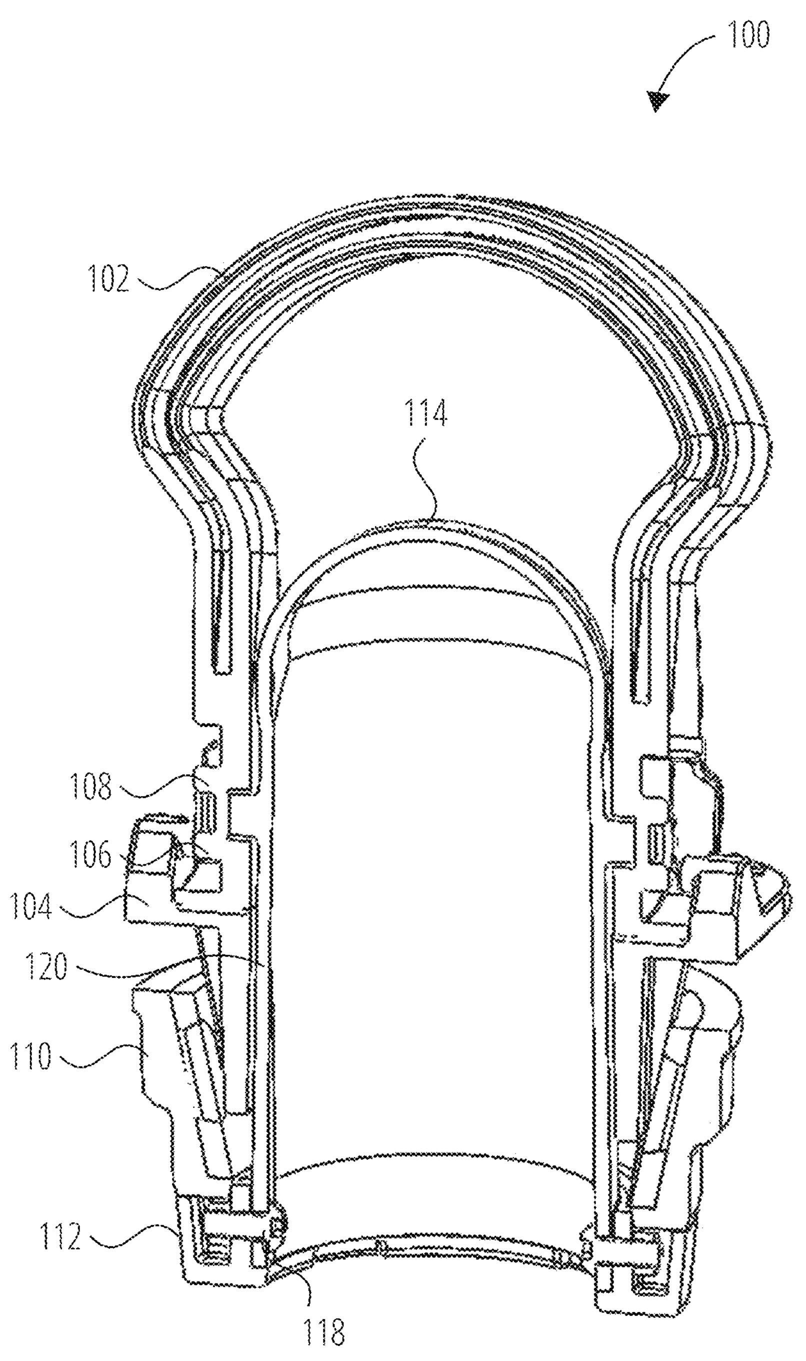
FIG. 6 is a diagram showing a skeleton front plan view of an example sewer expansion plug, in accordance with various embodiments of the disclosed technology.

FIG. 6 is a diagram showing a skeleton front plan view of an example sewer expansion plug 100, in accordance with various embodiments of the disclosed technology. Similarly to FIGS. 1-5, the sewer expansion plug 100 may include a handle 102, a wedge plate 104, a cam-shaped shoulder 106, a cam lock 108, a grip ring 110, a base 112, and a transparent elbow pipe 114. However, notably, FIG. 6 may further illustrate the structure of the wedge plate 104 in relation to grip ring 110, base 112, and cam-shaped shoulder 106. In particular, the cam-shaped shoulder 106, when rotated by the handle 102, may apply pressure to the top surface of the wedge plate 104, such that the wedge plate 104 expands the grip ring 110 outward (as discussed in relation to FIG. 5).

Furthermore, when the handle 102 is in the unlocked position, as depicted in FIG. 6, there may be space between the underside of the top surface of the wedge plate 104 and the top area of the grip ring 110. Similarly, there may be space between the bottom area of the circular frame and the base 112. This may be different from when the handle 102 is in the locked position, as depicted in FIG. 7, where such spacing may no longer be present due to the depression of the wedge plate 104 by rotation of the handle 102.

Furthermore, FIG. 6 may further illustrate a fastener 118, which may be a screw, nut, bolt, and/or rivet to secure the transparent elbow pipe 114 to the base 112. Additionally, FIG. 6 may further illustrate a guide rail 120, which may integrate into the transparent elbow pipe 114. The guide rails 120 may be vertical protrusions that are matched with vertical cutouts on an inner surface of the wedge. The guide rails may limit the rotation of the wedge around the Z axis and provide a guide for the wedge to slide along the transparent elbow pipe 114 body.

Figure 7:
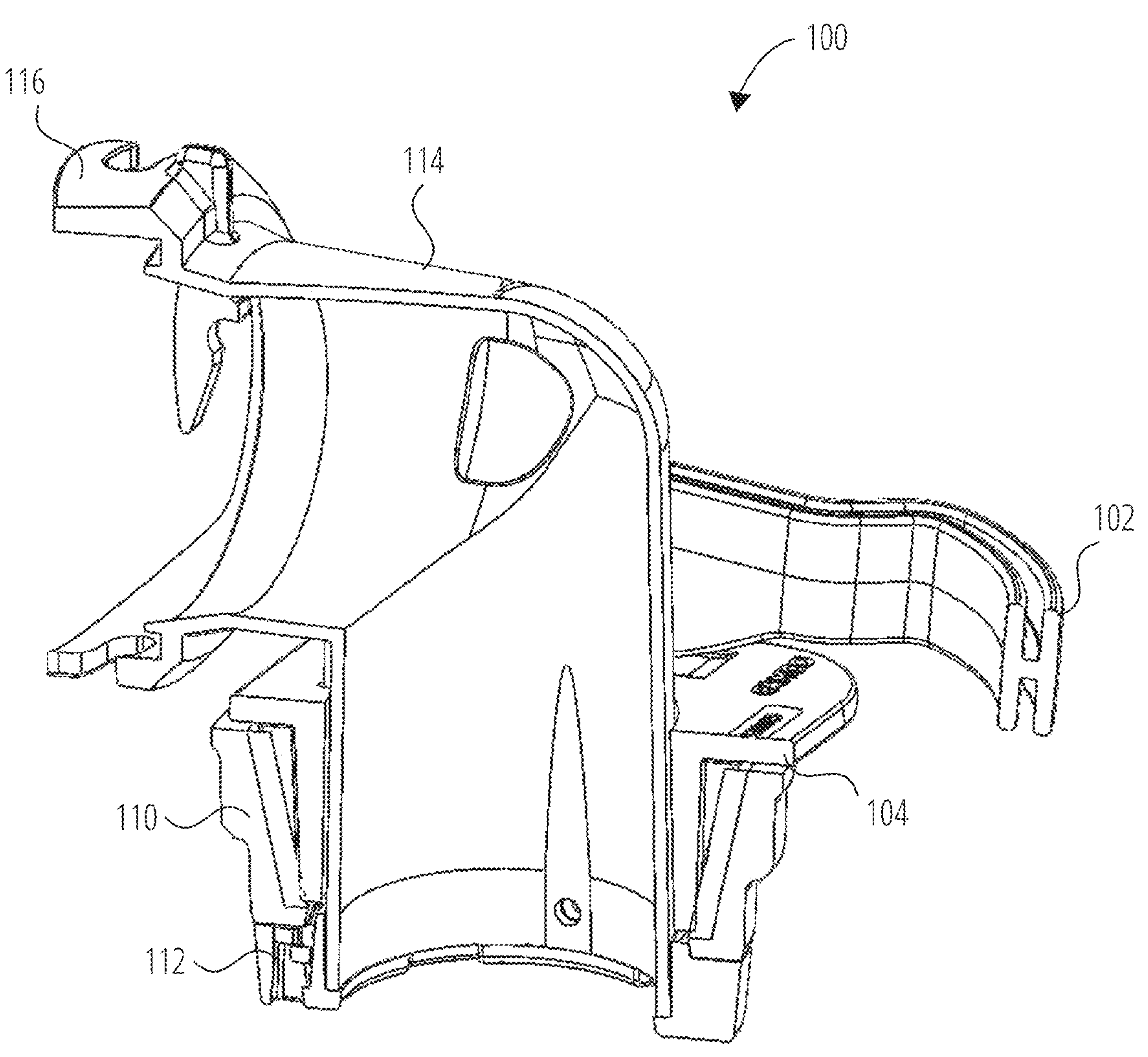
FIG. 7 is a diagram showing a skeleton rear perspective view of an example sewer expansion plug with a handle rotated and in a locked position, in accordance with various embodiments of the disclosed technology.

FIG. 7 is a diagram showing a skeleton rear perspective view of an example sewer expansion plug 100 with a handle 102 rotated and in a locked position, in accordance with various embodiments of the disclosed technology. Similarly to FIGS. 1-6, the sewer expansion plug 100 may include a handle 102, a wedge plate 104, a grip ring 110, a base 112, a transparent elbow pipe 114, and a bayonet attachment 116. However, notably, the handle 102 may be in a locked position such that it has been rotated approximately 90 degrees. The handle 102 may rotate from −10 degrees to 110 degrees, with locking via the cam lock occurring at approximately 90 degrees. Other embodiments may have the cam lock place the handle 102 in the locked position at different degrees. In comparison to FIG. 6, FIG. 7 may illustrate the wedge plate 104 in a depressed position such that the circular frame has expanded the grip ring 110 due to its depression. As compared to FIG. 6, the space identified between the grip ring 110, base 112, and wedge plate 104, is reduced or otherwise not present upon depression of the wedge plate 104.

Figure 8:
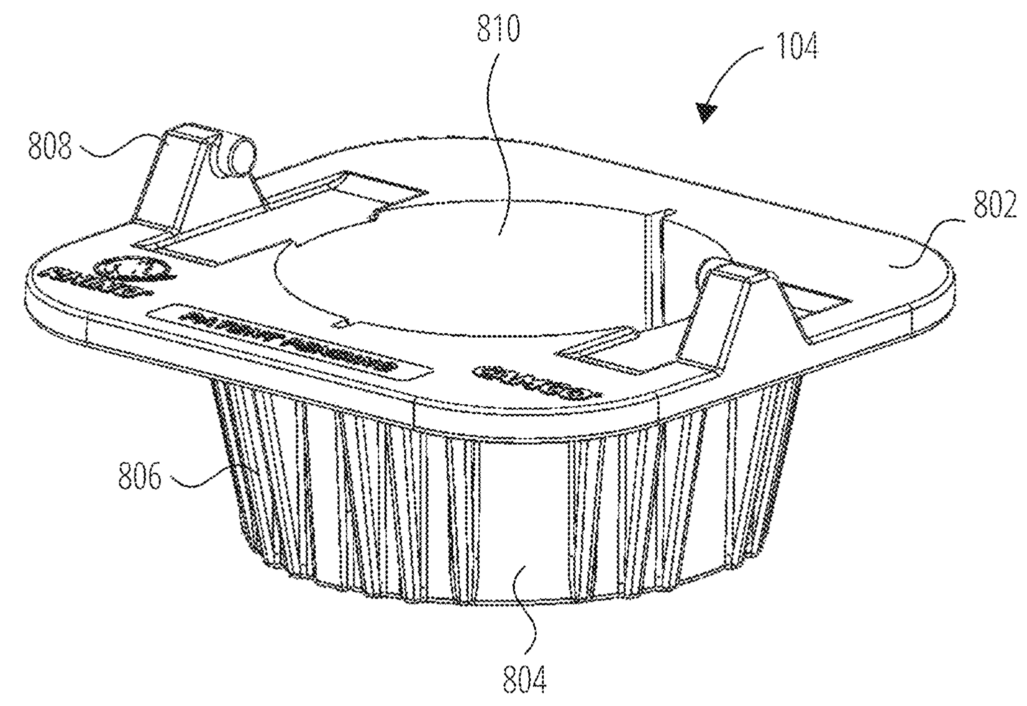
FIG. 8 is a diagram showing two perspective views of an example wedge plate; the first example wedge plate without overmolded rubber covers, the second wedge plate including overmolded rubber covers, in accordance with various embodiments of the disclosed technology.
Figure 8:
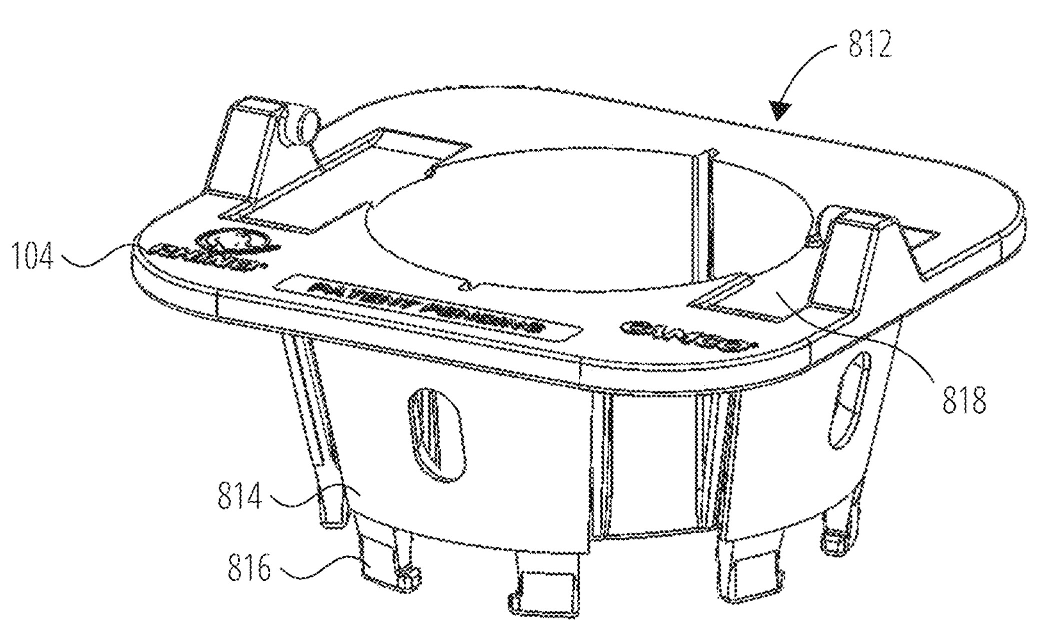

FIG. 8 is a diagram showing two perspective views of an example wedge plate 104; the first example wedge plate 104 without overmolded rubber covers, the second wedge plate including overmolded rubber cover 812, in accordance with various embodiments of the disclosed technology. The wedge plate 104 may include a top surface 802. The top surface 802 may be square with rounded edges. The top surface 802 may also include a pipe channel 810 disposed through the center thereof. The pipe channel 810 may be of a comparable circumference to the outside diameter of the transparent elbow pipe. A circular frame 804 may be connected to the bottom side of the top surface 802. The circular frame 806 may extend perpendicularly down from the top surface 802. The circular frame 804 and top surface 802 may be molded as a single piece of material or may be secured together from two separate pieces. The circular frame may include slides 806 disposed on an exterior wall. The slides 806 may be angled to expand the grip ring outward, or away from the circular frame 804, when the wedge plate 104 is depressed by the handle. In some embodiments the circular frame 804 may be vertically planer, such that the circumference remains constant from vertical top to bottom. In such embodiments, the slides 806 may be angled to facilitate expansion of the grip ring. In other embodiments, the circular frame 804 may be angled to facilitate expansion of the grip ring. In further embodiments, both the circular frame 804 and the slides 806 may be angled to facilitate expansion of the grip ring.

The top surface 802 of the wedge plate 104 may further include a cam-shaped shoulder receiver 808. The cam-shaped shoulder receiver 808 may protrude from the top surface 802 and may be triangular with a flat surface on top. Other geometries of the cam-shaped shoulder receiver 808 may exist, including embodiments that can separately accommodate the cam-shaped shoulder of the handle.

The wedge plate may further include a cover 814. The wedge plate cover 814 may cover the slides 806 such that when pressure is applied to the grip ring, the slides 806 more evenly distribute expanding pressure via the wedge plate cover 814 onto the grip ring. The wedge plate cover 814 may be a molded plastic that is either formed as a single piece with the wedge plate and slides with cover 812 or attached to the wedge plate as a distinct piece.

The wedge plate with cover 812 may further include a base connector 816. The base connector 816 may be a set of protrusions extending from the bottom of the circular frame 804 and may connect the wedge plate to the base.

The wedge plate may further include a cam-shaped shoulder channel 818, which may be a depression into the top surface of the wedge plate such that when the handle is rotated, the additional material on the ends of the handle (which form the cam shape) can pass through the cam-shaped shoulder channels 818 or depress the wedge plate top surface 802 thereon.

Figure 9:
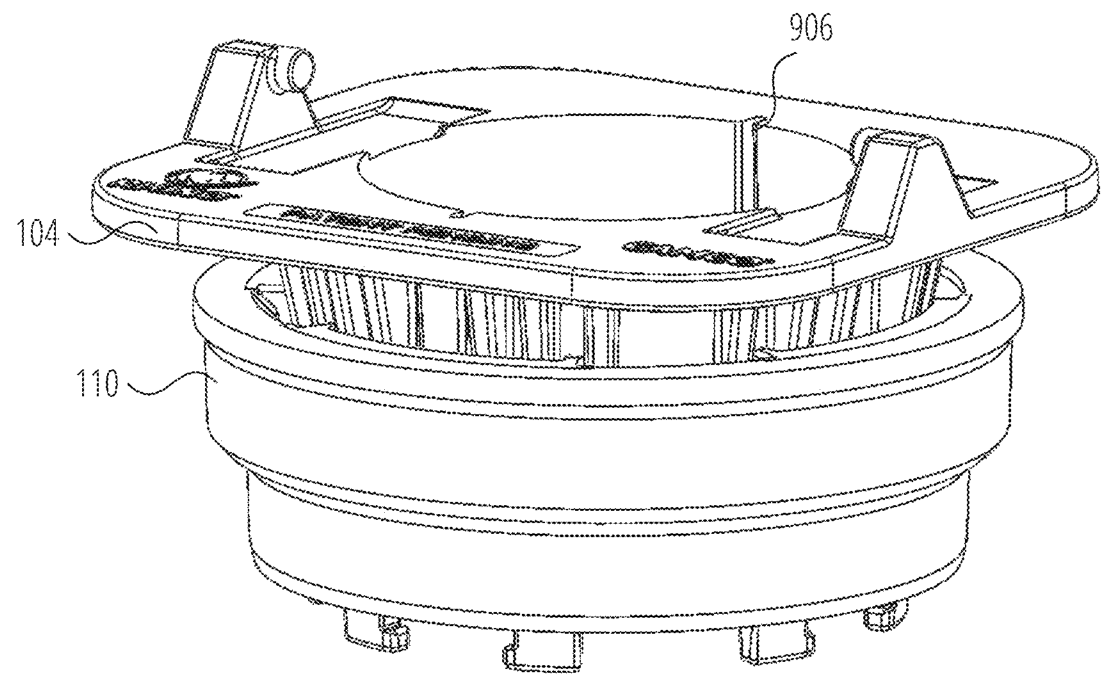
FIG. 9 is a diagram showing a front perspective view and a skeleton front perspective view, respectively, of an example wedge plate surrounded by a grip ring, in accordance with various embodiments of the disclosed technology.
Figure 9:
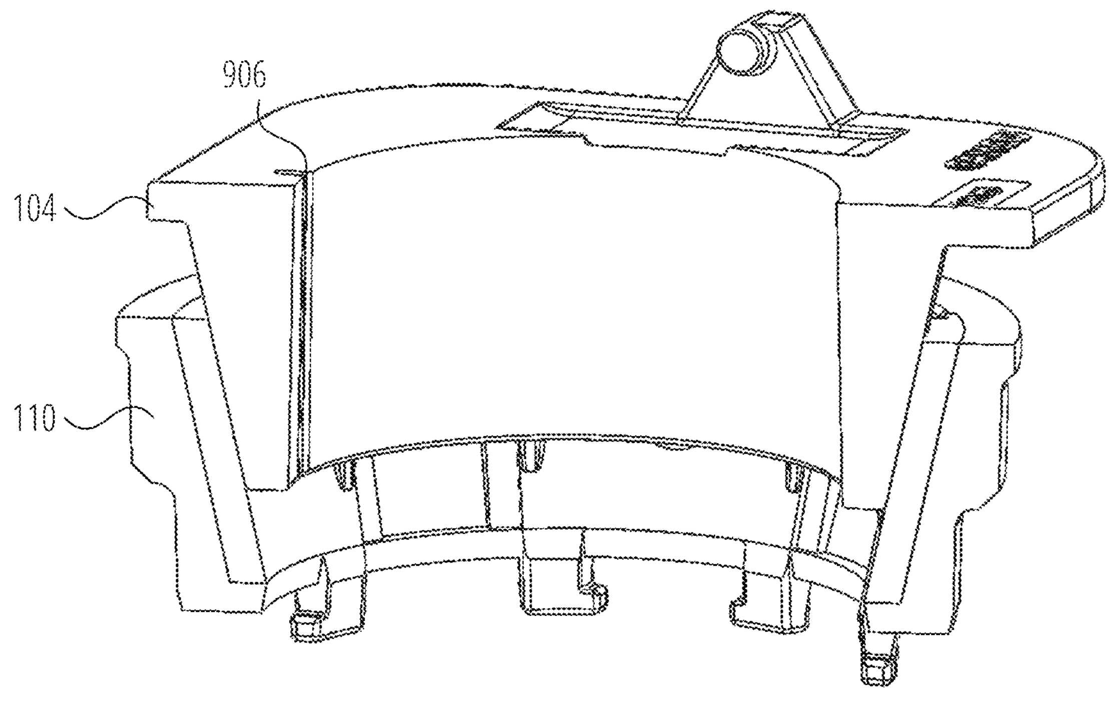

FIG. 9 is a diagram showing a front perspective view and a skeleton front perspective view, respectively, of an example wedge plate 104 surrounded by a grip ring 110, in accordance with various embodiments of the disclosed technology. The wedge plate 104 may be surrounded or encircled by a grip ring 110. The grip ring 110 may extend beyond the wedge plate's circular frame such that portions of the grip ring 110 are not directly contacted by the wedge plate or wedge plate cover. Additionally, FIG. 9 illustrates the guide rail channels 906 that the guide rails attached to the transparent elbow pipe may slide through. The guide rail channels 906, in combination with the guide rails, may limit the rotation of the transparent elbow pipe when secured through the wedge plate. Additionally, the wedge plate may slide along the guide rails via the guide rail channels.

FIG. 10 is a diagram showing a skeleton side perspective view of an example wedge plate 104 surrounded by a grip ring 110 attached to a base 112, where the wedge plate 104 is further connected to a handle 102, in accordance with various embodiments of the disclosed technology. In particular to FIG. 10, the sewer expansion plug 100 may include the base 112 secured to the wedge plate 104 and further encompass a lower portion of the grip ring 110 to prevent the grip ring 110 from disconnecting from the sewer expansion plug 100.

FIG. 11 is a diagram showing two skeleton side perspective views of an example wedge plate 104 connected to a handle 102 where the handle 102 is actuated and in a locked position, respectively, in accordance with various embodiments of the disclosed technology. The sewer expansion plug 100 may include two operation states. The first operation state, e.g., unlocked position, may be depicted with respect to FIGS. 1-3, 5-6, 10, and 14. The second operation state, e.g., locked position, may be depicted with respect to FIGS. 4, 7, 11, and 15. The sewer expansion plug 100 may be operated on by actuating or rotating the handle 102 from the unlocked position to the locked position. By rotating the handle 102 from the unlocked position to the locked position, the wedge plate 104 may be depressed expanding the grip ring 110. Note, by depressing the wedge plate 104, the base 112 does not move and remains stable.

Figure 12:
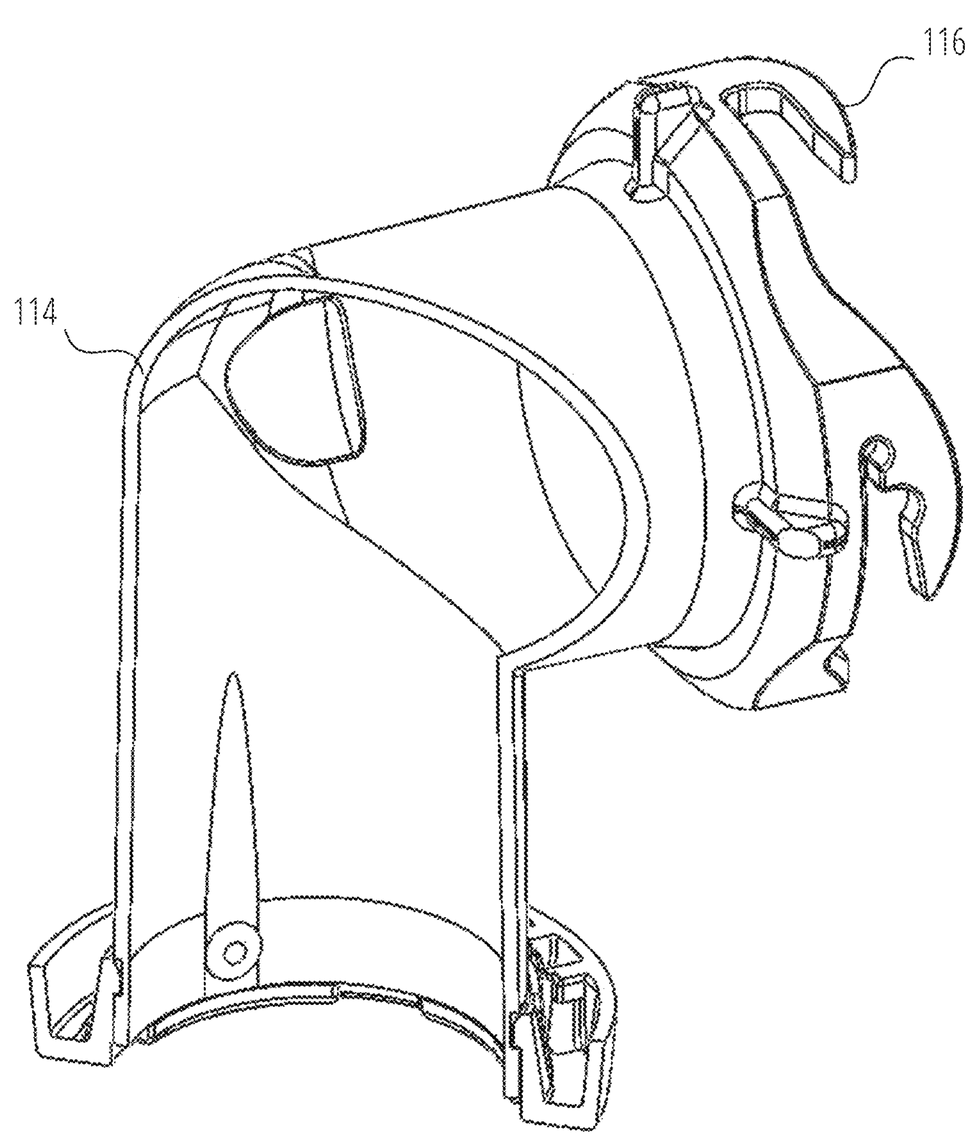
FIG. 12 is a diagram showing a perspective view of an example transparent elbow pipe, in accordance with various embodiments of the disclosed technology.
Figure 13:
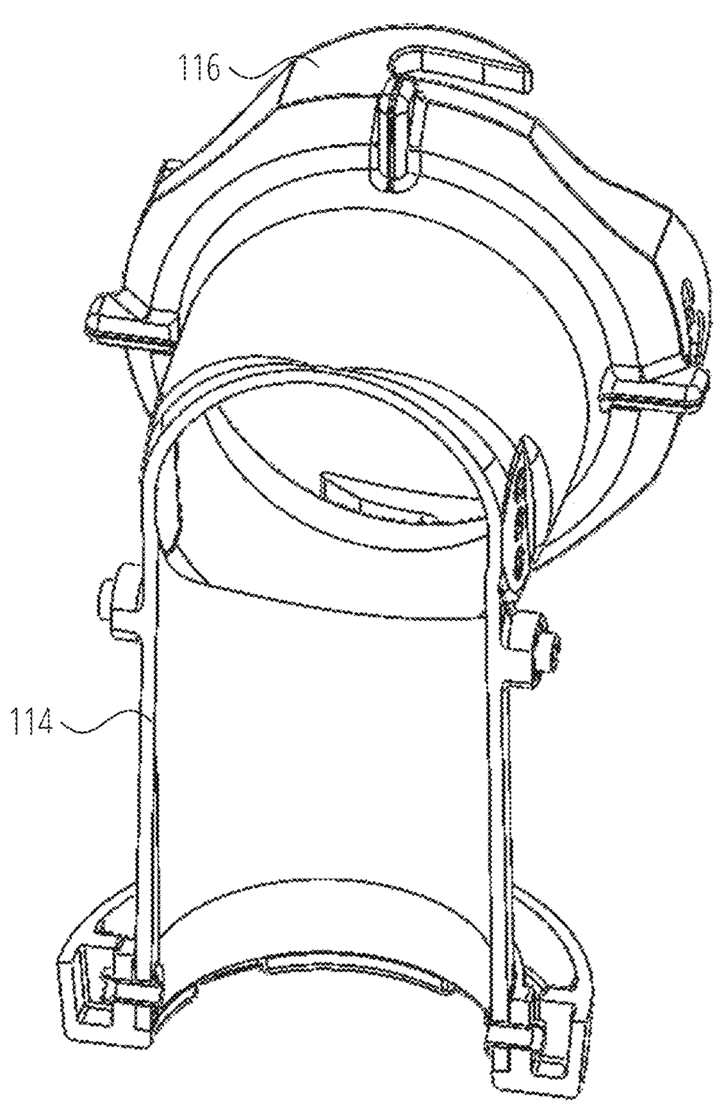
FIG. 13 is a diagram showing a second perspective view of an example transparent elbow pipe, in accordance with various embodiments of the disclosed technology.

FIGS. 12 and 13 are each diagrams showing perspective views of an example transparent elbow pipe 114, in accordance with various embodiments of the disclosed technology. The transparent elbow pipe 114 may include a circumference and a height. The circumference may be the internal or external circumference of the pipe. The height may be the vertical height of the pipe from the end that does not include the bayonet attachment 116 to the curve and a length from the curve to the bayonet attachment 116. The length may be a greater length than half the lateral width of the top surface of the wedge plate, such that the length extends past an edge of the top surface of the wedge plate.

The transparent elbow pipe 114 may include a bayonet attachment 116 to facilitate sewer hose connections while allowing for clear or partially clear visibility into the flow within the pipe. The structure of the transparent elbow pipe 114 may include a durable, transparent, or partially transparent plastic or polymer material that is resilient to wear and chemical exposure. The transparent elbow pipe 114 may include an elbow featuring a curvature, which may be optimized for flow, while preventing blockages. At one end of the transparent elbow pipe 114 may be a bayonet attachment 116. The bayonet attachment 116 may secure and/or connect a standard sewer hose to the transparent elbow pipe 114, allowing for assembly and disassembly without additional tools. The transparency of the pipe can serve various purposes, first, it may enable the user to monitor the flow and detect any obstructions, and second, it may allow a user to ensure the connection is properly secured. Other shapes or pipe structures may exist. For example, the transparent elbow pipe 114 may be straight or include two elbows.

Figure 14:
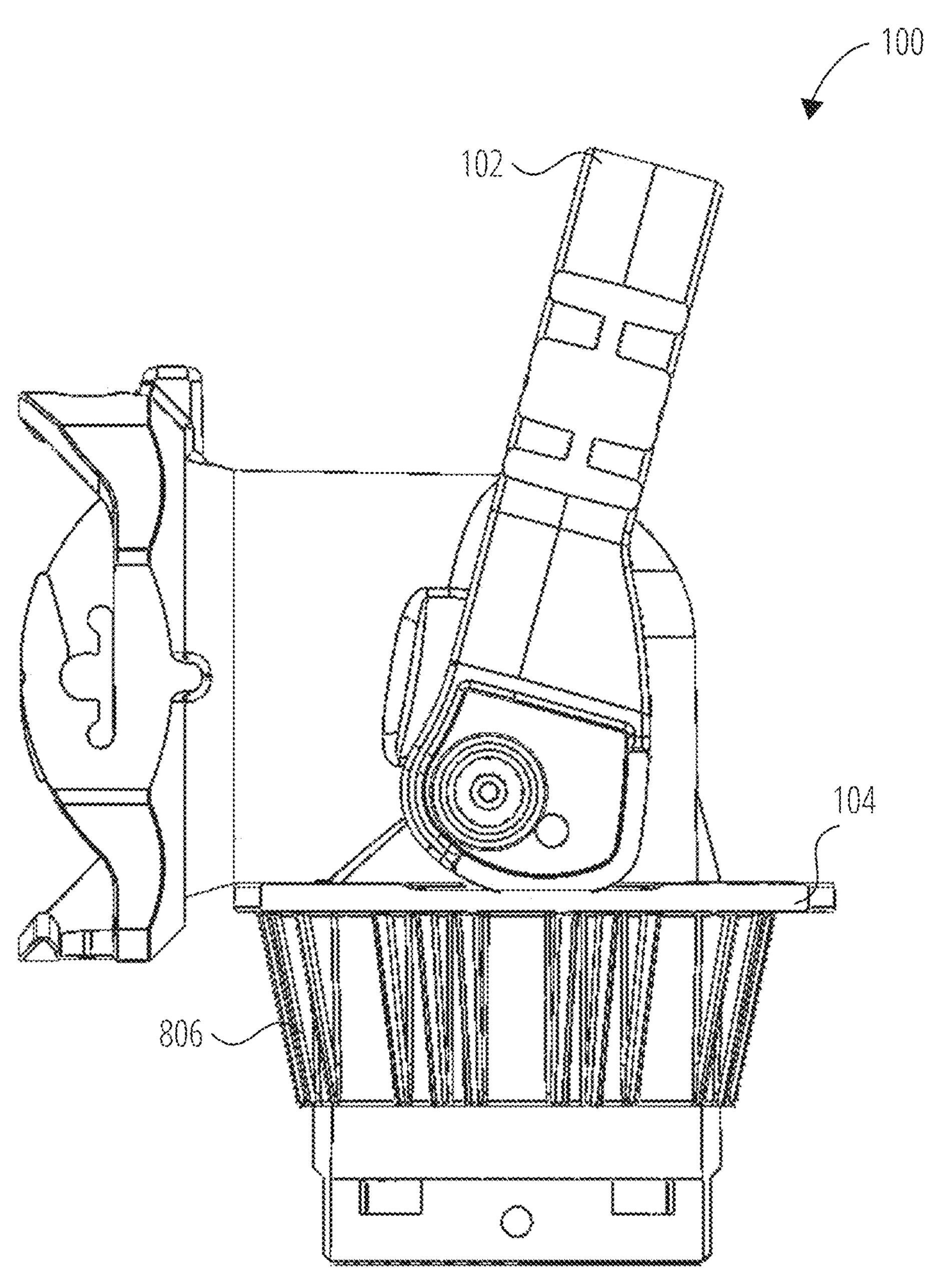
FIG. 14 is a diagram showing a side plan view of an example sewer expansion plug without a grip ring or base and with a handle in an unlocked position, in accordance with various embodiments of the disclosed technology.
Figure 15:
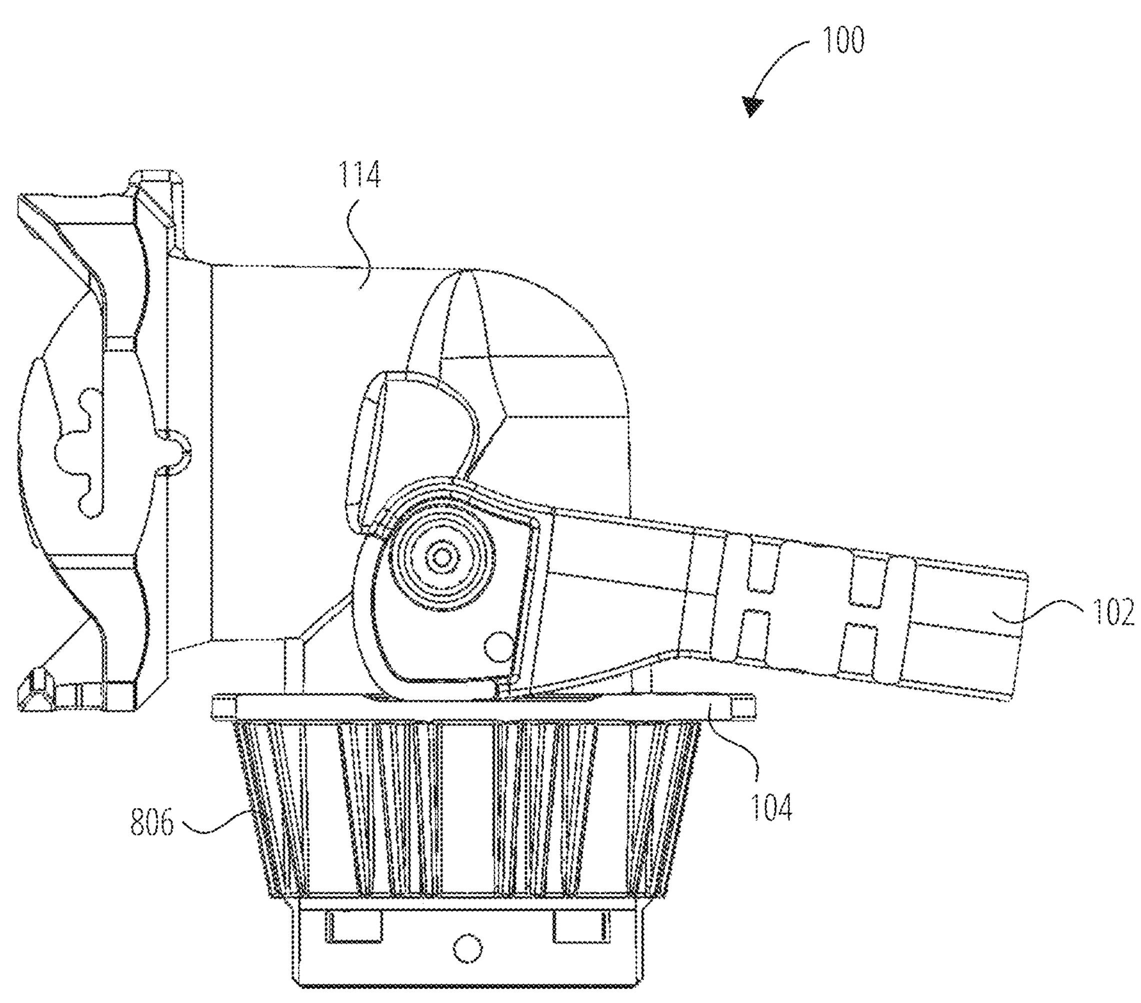
FIG. 15 is a diagram showing a side plan view of an example sewer expansion plug without a grip ring or base and with a handle in a locked position, in accordance with various embodiments of the disclosed technology.

FIGS. 14 and 15 are diagrams showing side plan views of an example sewer expansion plug 100 without a grip ring or base and with a handle 102 in an unlocked position and a locked position, respectively, in accordance with various embodiments of the disclosed technology. The wedge plate 104 may move vertically when the handle 102 is rotated from the unlocked position to the locked position. For example, in FIG. 14, the handle 102 may be in the unlocked position and the wedge plate 104 may be raised. Alternatively, in FIG. 15, the handle 102 may be in the locked position and the wedge plate 104 may be lowered. When the wedge plate 104 is lowered, the slides 806 may press and/or expand the grip ring (not shown).

Figure 16:
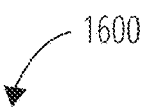
FIG. 16 is a diagram showing a method of connecting a sewer expansion plug to a cleanout pipe, in accordance with various embodiments of the disclosed technology.
Figure 16:
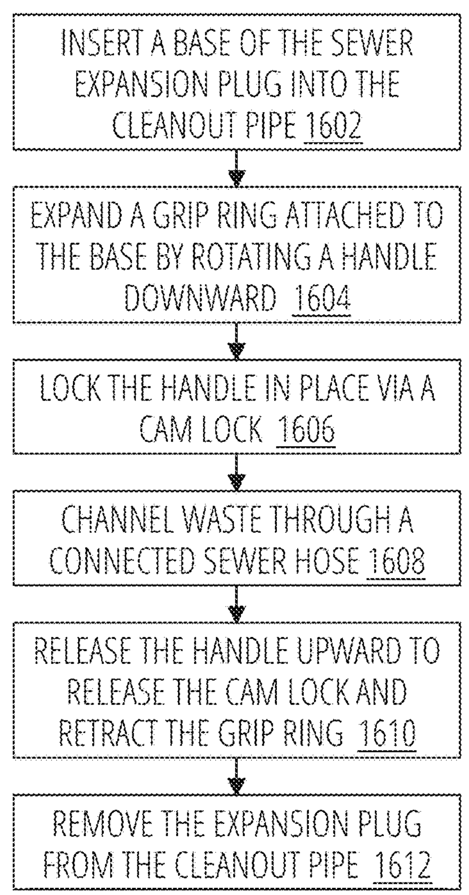

FIG. 16 is a diagram showing a method 1600 of connecting a sewer expansion plug to a cleanout pipe, in accordance with various embodiments of the disclosed technology. In block 1602, method 1600 inserts a base of the sewer expansion plug into the cleanout pipe. In block 1604, method 1600 expands a grip ring attached to the base by rotating a handle downward. In block 1606, method 1600 locks the handle in place via a cam lock. In block 1608, method 1600 channels waste through a connected sewer hose. In block 1610, method 1600 releases the handle upward to release the cam lock and retract the grip ring. In block 1612, method 1600 removes the expansion plug from the cleanout pipe.

Further embodiments of the method 1600 may include sliding the wedge plate to expand the grip ring by rotating the handle downward, inserting the base a predetermined amount corresponding to the diameter of the cleanout pipe, attaching the sewer hose before inserting the sewer expansion plug into the cleanout pipe, attaching the sewer hose after inserting the sewer expansion plug into the cleanout pipe, and inspecting a transparent elbow pipe to ensure completion of waste discharge.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

The terms "approximately" and "substantially" are used to account for variations that may occur due to manufacturing tolerances, measurement inaccuracies, and other practical considerations in implementing the described technology. The term "approximately" refers to a value or range that is close to the stated value but allows for minor deviations, typically within ±10%, unless otherwise specified, that do not materially affect the function or purpose of the invention. Similarly, the term "substantially" is used to indicate that a particular feature, characteristic, or result is largely present or achieved, with allowable variations without deviating from the intended scope and function of the invention. These terms should be interpreted in a manner consistent with the understanding of a person skilled in the art.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A sewer expansion plug, comprising:
- a handle;
- a pipe attachable to a sewer hose;
- a wedge plate mechanically connected to the handle;
- slides coupled to the wedge plate;
- a grip ring surrounding the pipe, wedge plate, and slides, wherein the grip ring expands outward when moved by the wedge plate; and
- a base attached to the wedge plate and the pipe, wherein the base secures the grip ring,
- wherein the wedge plate translates a rotational force generated by rotation of the handle into linear movement and wherein the slides are vertically angled in relation to the wedge plate.

2. The sewer expansion plug of claim 1, wherein the handle is releasably secured in a locked position by a cam lock.

3. The sewer expansion plug of claim 1, wherein the grip ring comprises a flexible elastomeric material annular ring comprising stepped increments.

4. The sewer expansion plug of claim 1, wherein the grip ring comprises a textured surface.

5. The sewer expansion plug of claim 1, wherein the pipe comprises a transparent elbow pipe and a male or female bayonet attachment.

6. The sewer expansion plug of claim 1, wherein the wedge plate further comprises guide rails.

7. The sewer expansion plug of claim 6, wherein the base is attached to the guide rails.

8. A sewer expansion plug for connecting a sewer hose to a blackwater disposal system, comprising:
- a molded plastic handle comprising a cam-shaped shoulder;
- a transparent elbow pipe attachable to a blackwater disposal hose;
- a wedge plate mechanically connected to the handle and slides, and wherein the wedge plate encircles a portion of the transparent elbow pipe;
- a flexible elastomeric grip ring comprising variable diameters and surrounding a circular frame of the wedge plate, and slides; and
- a molded plastic base attached to the grip ring, wedge plate, and transparent elbow pipe, wherein the molded plastic base aligns the wedge plate and grip ring,
- wherein the wedge plate translates a rotational force generated by rotation of the molded plastic handle into linear movement of the wedge plate along the slides and wherein the diameter of the flexible elastomeric grip ring is varied by actuation of the handle mechanically connected to the wedge plate interfacing with the grip ring.

9. The sewer expansion plug of claim 8, wherein the molded plastic handle is releasably secured in a locked position by the cam-shaped shoulder engaging a cam lock.

10. The sewer expansion plug of claim 8, wherein the flexible elastomeric grip ring comprises a textured surface.

11. The sewer expansion plug of claim 8, wherein the transparent elbow pipe comprises a male or female bayonet attachment.

12. The sewer expansion plug of claim 8, wherein the flexible elastomeric grip ring comprises stepped increments.

13. The sewer expansion plug of claim 8, wherein the slides are attached to the circular frame of the wedge plate.

14. The sewer expansion plug of claim 8, wherein the flexible elastomeric grip ring's variable diameters correspond to cleanout pipe diameters.

15. A method of connecting a sewer expansion plug to a cleanout pipe, the method comprising:
- inserting a base of the sewer expansion plug into the cleanout pipe;
- expanding a grip ring attached to the base by rotating a handle;
- locking the handle in place via a cam lock;
- channeling waste through a connected sewer hose;
- releasing the handle to release the cam lock and retract the grip ring; and
- removing the expansion plug from the cleanout pipe.

16. The method of claim 15, wherein rotating the handle further comprises sliding a wedge plate to expand the grip ring.

17. The method of claim 15, wherein inserting the base of the expansion plug into the cleanout pipe further comprises inserting the base a predetermined amount corresponding to a diameter of the cleanout pipe.

18. The method of claim 15, further comprising attaching the sewer hose before inserting the sewer expansion plug into the cleanout pipe.

19. The method of claim 15, further comprising attaching the sewer hose after inserting the sewer expansion plug into the cleanout pipe.

20. The method of claim 15, further comprising inspecting a transparent elbow pipe to ensure completion of waste discharge.

* * * * *